United States Patent [19]

Sharp et al.

[11] 4,119,020
[45] Oct. 10, 1978

[54] APPARATUS FOR MAKING HOT DOGS AND THE LIKE

[76] Inventors: Douglas Cecil William Thomas Sharp, Three Gables, New Road Hill, Midgam, Berkshire; Frank Ellis, 56 Thamespoint, Fairways Broom Rd., Teddington, Middlesex, both of England

[21] Appl. No.: 792,853

[22] Filed: May 2, 1977

[30] Foreign Application Priority Data

May 10, 1976 [GB] United Kingdom ............... 19208/76

[51] Int. Cl.² ............................................. A47J 37/08
[52] U.S. Cl. ........................................ 99/339; 99/357; 99/419; 99/441; 219/521; 219/523
[58] Field of Search ............... 219/202, 385, 403, 521, 219/523, 530; 99/339, 357, 358, 419, 441

[56] References Cited

U.S. PATENT DOCUMENTS

| | | | |
|---|---|---|---|
| 1,902,564 | 3/1933 | Mabey | 99/419 |
| 1,990,412 | 2/1935 | Merritt | 99/419 X |
| 2,059,133 | 10/1936 | Merritt | 99/419 X |
| 2,735,356 | 2/1956 | Sacks | 99/339 |
| 3,377,943 | 4/1968 | Martin | 99/419 |
| 3,635,146 | 1/1972 | Aubert | 99/339 |
| 3,792,653 | 2/1974 | Davidson | 99/339 |
| 3,948,159 | 4/1976 | Vigerstrom | 99/358 |
| 3,965,808 | 6/1976 | Chomette | 99/419 |

FOREIGN PATENT DOCUMENTS

| | | | |
|---|---|---|---|
| 1,141,066 | 3/1957 | France | 99/339 |
| 822,286 | 10/1959 | United Kingdom | 99/339 |

*Primary Examiner*—Volodymyr Y. Mayewsky
*Attorney, Agent, or Firm*—Lawrence E. Laubscher

[57] ABSTRACT

A device for providing a cavity in a bun for receiving a filling such as a sausage comprises a heating probe adapted to be inserted into a bun to compress the material of the bun to form the cavity and to toast the surface of the cavity so that the cavity remains after removal of the probe therefrom and locating means in the form of a cradle for locating a bun in alignment with the heating probe. Relative reciprotable movement between the probe and the locating means causes the probe to be inserted into and removed from a bun located in the locating means.

10 Claims, 2 Drawing Figures

U.S. Patent  Oct. 10, 1978  Sheet 2 of 2  4,119,020

APPARATUS FOR MAKING HOT DOGS AND THE LIKE

This invention relates to making hot dogs or the like.

According to the invention there is provided a device for providing a cavity in a bun for receiving a sausage or other filling, comprising a heating probe adapted to be inserted into a bun to compress the material of the bun to form the cavity and to toast the surface of the cavity so that the cavity remains after removal of the probe therefrom, locating means for locating a bun in alignment with the heating probe, and means for causing relative reciprocatable movement between the probe and the locating means for causing the probe to be inserted into and removed from a bun located in the locating means in use.

The invention also includes a machine for use in making hot dogs or the like comprising a casing housing a device as set forth above and a further device for cooking sausages or other fillings.

Figure 1:
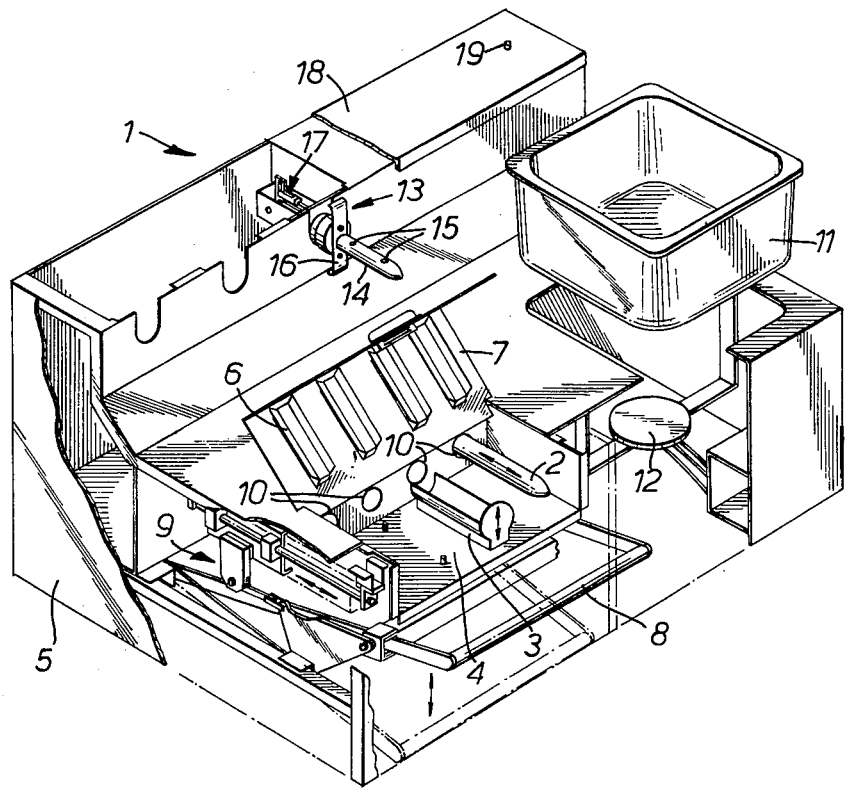
Figure 2:
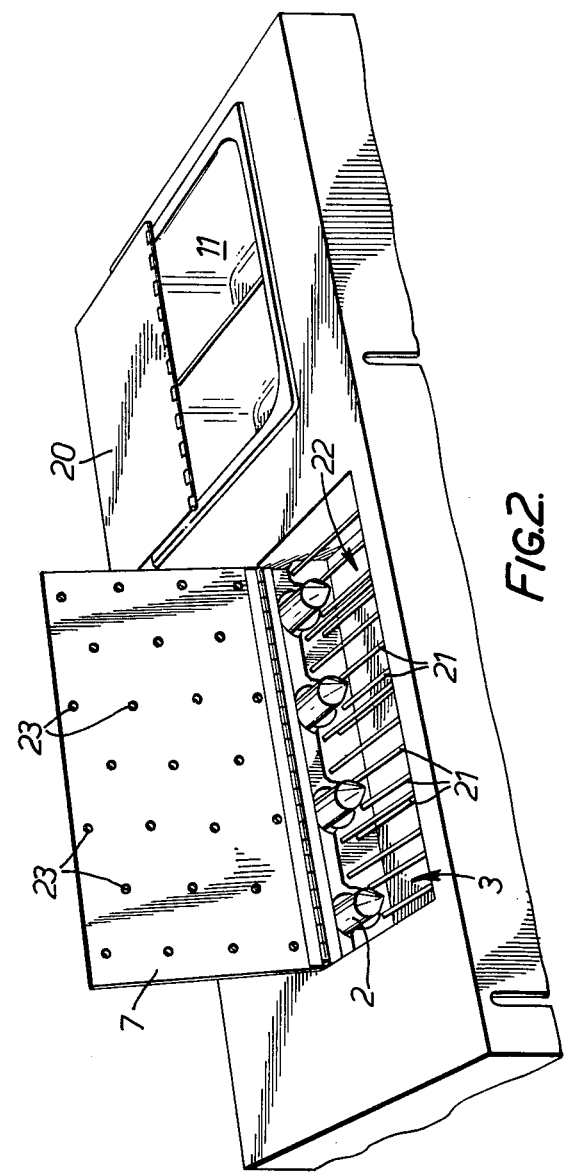

In order that the invention may be well understood, two embodiments thereof, which are given by way of example only will now be described, reference being made to the accompanying drawings, in which FIGS. 1 and 2 show fragmentary perspective views of two respective hot dog making machines, like parts in the two figures being designated by like reference numerals.

Referring to FIG. 1 there is shown a hot dog machine having on its left hand side a device for providing cavities in buns for receiving sausages or other hot dog fillings. The device comprises a plurality of probes 2 (one only shown) arranged with their longitudinal axes substantially parallel and a corresponding number (which is four in this instance) of locating means aligned with the probes. Each locating means comprises a cradle 3 (only one shown) mounted on a base portion 4 of a compartment provided in a recess in a casing 5 of the machine and a lid 6 (all four of which are shown) mounted on a hinged cover 7 for the compartment such that a bun placed in a cradle through the top opening thereof when the cover 7 is open (as shown in the drawing) is retained therein by the lid 6 of the cradle, which closes the opening, when the cover is closed.

The probes 2 are simultaneously reciprocatably movable along their longitudinal axes be means of a handle 8 and a linkage 9 connected thereto from withdrawn or retracted positions within the casing 5 through apertures 10 in a plate attached to the casing to exposed or extended positions within the compartment where they are inserted into their respective bun locating means. In the drawing, the cover 7 is open, and the probes are withdrawn, the handle 8 being in an upper position: however, for the purpose of illustration only, the right hand probe is shown in its extended position corresponding to the lower position of the handle 8.

Each probe 2 is pointed to facilitate insertion into a bun, and the ends of the cradles remote from the apertures 10 are closed to prevent the probes pushing the buns out of the cradles. Each probe is provided with a heating element which extends within a longitudinal bore in the probe to heat the probe so that it toasts the surfaces of the cavity formed thereby in the bun. Typically, the heating element comprises an electrical resistance rod element rated at about 450 watts. Control means (not shown) may be provided for controlling the heat output of the probes. The probe 2 is covered with a non-stick coating, for example a coating of heat resistant material such as PTFE, to assist prevention of the probe adhering to the bun. The plate in which the apertures 10 are formed ensures that the buns cannot be drawn out of the compartment into the casing when the probes are withdrawn.

The machine also includes a device for cooking sausages or other filling for insertion into the buns and as illustrated this comprises a container 11 (shown removed from the casing) for water which is mounted adjacent the probes and is heated by a heating element 12. Preferably, the heating element is adjustably controllable to maintain water in the container 11 at any desired cooking temperature. A cover (not shown) hinged to the casing covers the container 11 when in a closed position.

The machine is also provided with one or more dispensing devices for dispensing semi-fluid dressings, for example, mustards, ketchups or pickle into the bun cavity prior to insertion of the sausage therein.

Typically, three such devices are provided, and in the drawing there is shown one device, referenced 13, although space is provided for two further dispensing devices. The dispensing device 13 comprises a probe 14 having outlets 15 spaced along its length connected to a bore in the probe which is coupled to a displacement pump (not shown). Movement of a push bar 16 of the dispensing device rearwards (as viewed in the drawing) moves the probe, which is connected to the push bar for movement therewith in the embodiment, from the dotted line position to the solid line position and causes a linkage 17 to operate the pump, which is connected to a reservoir of dressing, to cause a metered amount of dressing to be dispensed through the outlets 15.

In operation buns are placed in the cradles 3, the cover 7 is closed and the handle 8 depressed to cause the probes 2 to be inserted into the buns to compress the material thereof to form a cavity in each bun and to toast the surface of the cavity. The handle is then moved to its upper position (it may be biased into this position) so that the probes 2 are withdrawn, the cover 7 is raised and the buns removed from the cradles. It will be noted that the operator does not have to handle the buns during formation and toasting of the cavity, and this reduces the risk of the operator being burnt by the probes 2. It is envisaged that operation of the cover 7 and the probe actuating linkage 9 may be interlinked so that the cover 7 can only be opened when the probes are in the withdrawn position within the casing.

If it is desired that the hotdog contain a dressing the bun is positioned on the appropriate dispensing device with the probe 14 thereof extending into the bun cavity and the push bar is pushed to actuate the pump to dispense dressing into the bun through the outlets 15 in the probe 14.

Thereafter, a cooked sausage is removed from the container 11 and inserted into the bun cavity.

The casing 5 has an upper platform 18 and its rear on which one or more storage boxes may be mounted. For example a box for containing a supply of buns may be mounted behind the container 11, and to this end a location pin 19 for such a box extends upwardly from the platform 18. Means (not shown) are preferably provided to allow moisture from the container 11 to communicate with the bun box keep buns stored therein moist. A further storage box may be mounted above the dispensing devices 13.

Referring now to FIG. 2 there is shown another hot dog machine, illustrated as comprising a device for providing the cavities in buns and a further device for cooking sausages or other hot dog fillings. The cooking device is similar to the corresponding device of the machine shown in FIG. 1 but has a cover 20 for its container 11, and the cavity forming device differs primarily in the formation of the bun locating means.

The bun locating means associated with each probe comprises a plurality of elongate members which extend substantially parallel to the longitudinal axes of the probes. As shown each locating means comprises a cradle formed with bars 21, shown as five in number, arranged to define a generally semi-cylindrical space for receiving a bun which is placed within the cradle through an opening 22 defined between the two upper bars. The opening 22 of each cradle is closed so as to retain a bun therein by the cover 7 when the latter is closed. Advantageously the cover 7 is provided with a plurality of apertures 23 for ventilation.

It is to be understood that although the cavity forming device in each of the illustrated machines is provided with four probes, any number (including only one) may be provided.

Further, although it is the probes that are reciprocated in the illustrated machines, the relative reciprotating movement between the probes and the bun locating means may be achieved by making the locating means only or both the locating means and the probes reciprocatable.

We claim:

1. A device for providing a cavity in a bun for receiving a filling, comprising a heating probe adapted to be inserted into a bun to compress the material of the bun to form the cavity and to toast the surface of the cavity so that the cavity remains after removal of the probe therefrom, locating means for locating a bun in alignment with the heating probe, and means for causing relative reciprotable movement between the probe and the locating means for causing the probe to be inserted into and removed from a bun located in the locating means in use.

2. A device as claimed in claim 1 wherein said probe is reciprocatably movable along its longitudinal axis into and out of said locating means.

3. A device as claimed in claim 1 having a plurality of said heating probes, each associated with a respective one of said locating means.

4. A device as claimed in claim 3 wherein said probes are arranged with their longitudinal axes substantially parallel.

5. A device as claimed in claim 3 wherein said means for causing relative reciprocatable movement is arranged to cause simultaneous relative reciprocatable movement between said probes and their respective locating means.

6. A device as claimed in claim 3 wherein each of said locating means comprises a cradle having a closable opening for allowing a bun to be positioned within the cradle.

7. A device as claimed in claim 6, wherein each cradle is disposed within a compartment having a cover for closing an access opening thereof, the arrangment being such that closure of the access opening by the cover effects closure of the closable openings of each respective cradle.

8. A device as claimed in claim 7, wherein each cradle comprises a plurality of bars arranged to define a generally semi-cylindrical space for receiving a bun through an opening defined between two upper ones of said bars.

9. A machine for use in making hot dogs or the like comprising a casing housing a device as claimed in claim 1 a further device for cooking sausages or other hot dog fillings arranged in a housing.

10. A device for providing a cavity in a bun comprising a plurality of heating probes, a plurality of cradle means, each cradle means being associated with a respective probe and arranged to locate a bun therein and means mounting said probes for simultaneous reciprocatable movement for movement into and withdrawal from said cradle means whereby to compress the material of the buns located therein in use to form a cavity in each bun and to toast the surface defining the cavity so that the cavity remains on withdrawal of the probe therein.

* * * * *